US011510360B2

(12) United States Patent
     Maisonneuve (10) Patent No.:     US 11,510,360 B2
(45) Date of Patent:     Nov. 29, 2022

(54) FERTILIZER GRADIENT ENERGY SYSTEM

(71) Applicant: Oakland University, Rochester, MI (US)

(72) Inventor: Jonathan Maisonneuve, Auburn Hills, MI (US)

(73) Assignee: Oakland University, Rochester, MI (US)

( * ) Notice: Subject to any disclaimer, the term of this patent is extended or adjusted under 35 U.S.C. 154(b) by 306 days.

(21) Appl. No.: 16/646,328

(22) PCT Filed: Sep. 10, 2018

(86) PCT No.: PCT/US2018/050159
     § 371 (c)(1),
     (2) Date: Mar. 11, 2020

(87) PCT Pub. No.: WO2019/051350
     PCT Pub. Date: Mar. 14, 2019

(65) Prior Publication Data
     US 2020/0267894 A1     Aug. 27, 2020

Related U.S. Application Data

(60) Provisional application No. 62/556,702, filed on Sep. 11, 2017.

(51) Int. Cl.
     *A01C 23/04*     (2006.01)
     *A01C 21/00*     (2006.01)
(52) U.S. Cl.
     CPC ............ *A01C 23/042* (2013.01); *A01C 21/00* (2013.01)

(58) Field of Classification Search
     CPC ........ A01C 23/04; A01C 21/00; A01C 23/042
     See application file for complete search history.

(56) References Cited

U.S. PATENT DOCUMENTS

| | | | |
|---|---|---|---|
| 5,440,836 A * | 8/1995 | Lee ...................... | A01G 31/06 47/60 |
| 11,040,904 B2 * | 6/2021 | Herron ................. | B01D 61/002 |

(Continued)

OTHER PUBLICATIONS

International Search Report PCT/US2018/050159, dated Nov. 8, 2018.

*Primary Examiner* — Monica L Perry
*Assistant Examiner* — Aaron M Rodziwicz
(74) *Attorney, Agent, or Firm* — Fishman Stewart PLLC (57) ABSTRACT

A fertilizer gradient energy system includes a membrane module. A membrane module may include a first section and a second section. The first and second sections may be separated by a semipermeable membrane. A load may be connected to the membrane module. The first section may be configured to receive a concentrated fertilizer solution. The second section may be configured to receive a freshwater feed solution. In embodiments, a semipermeable membrane may be configured to facilitate pressure retarded osmosis of the freshwater feed solution from the first section to the second section to increase a fluid pressure in the second section. The semipermeable membrane may include an anion exchange membrane. The membrane module may include a third section. A cation exchange membrane may separate the first and third section. Anion and cation exchange membranes may facilitate reverse electrodialysis. Methods of capturing energy via a membrane module are also disclosed.

25 Claims, 6 Drawing Sheets

(56) References Cited

U.S. PATENT DOCUMENTS

| | | | |
|---|---|---|---|
| 2002/0130078 A1* | 9/2002 | Tonkin | B01D 71/80 210/640 |
| 2010/0162619 A1* | 7/2010 | Peus | F28D 1/06 44/605 |
| 2010/0183903 A1 | 7/2010 | McGinnis et al. | |
| 2012/0292187 A1* | 11/2012 | Kim | B01D 61/44 204/527 |
| 2013/0220927 A1 | 8/2013 | Moody et al. | |
| 2015/0342133 A1* | 12/2015 | Nakajima | A01G 31/06 47/62 R |
| 2016/0167974 A1 | 6/2016 | Novek | |
| 2017/0028349 A1* | 2/2017 | Blandin | C02F 1/442 |

\* cited by examiner

FERTILIZER GRADIENT ENERGY SYSTEM

CROSS-REFERENCE TO RELATED APPLICATION

This application is a national phase application of and claims priority to International Patent Application No. PCT/US2018/050159, filed Sep. 10, 2018, which claims the benefit of U.S. Provisional Patent Application Ser. No. 62/556,702, filed on Sep. 11, 2017, the disclosure of which is hereby incorporated herein by reference in its entirety.

TECHNICAL FIELD

The present disclosure generally relates to energy and fluid systems, including fertilizer gradient energy systems.

BACKGROUND

This background description is set forth below for the purpose of providing context only. Therefore, any aspect of this background description, to the extent that it does not otherwise qualify as prior art, is neither expressly nor impliedly admitted as prior art against the instant disclosure.

About 70% of freshwater is used for agricultural purposes, and at least some portion is used for fertigation. Fertigation may, for example, involve the insertion or injection of fertilizers, soil amendments, or other water-soluble products into an irrigation system.

With some designs, concentration gradients may not be used efficiently and/or energy capture/conversion may be limited.

There is a desire for solutions/options that minimize or eliminate one or more challenges or shortcomings of energy systems. The foregoing discussion is intended only to illustrate examples of the present field and should not be taken as a disavowal of scope.

SUMMARY

In embodiments, a fertilizer gradient energy system may include a membrane module. A membrane module may include a first section and a second section. The first section and the second section may be separated by a semipermeable membrane. A load may be connected to the membrane module. The first section may be configured to receive a concentrated fertilizer solution. The second section may be configured to receive a water solution. In embodiments, a semipermeable membrane may be configured to facilitate pressure retarded osmosis of the water solution from the first section to the second section to increase a fluid pressure in the second section. Methods of capturing energy via a membrane module are also disclosed.

In embodiments, a fertilizer gradient energy system may include a membrane module including a first section, a second section, and/or a third section. The first section and the second section may be separated by an anion exchange membrane. The second section and the third section may be separated by a cation exchange membrane. A load may be connected to the membrane module. The first section may be configured to receive a concentrated fertilizer solution. The second section and the third section may be configured to receive a freshwater feed solution. The anion exchange membrane and/or the cation exchange membrane may be configured to facilitate reverse electrodialysis of ions of the freshwater feed solution from the first section to the second section and/or the third section to create a potential across the membrane module.

With embodiments, a method of capturing energy may include providing a membrane module including a first section and a second section, the first section and the second section being separated by a membrane; providing a concentrated fertilizer solution to the second section; providing a water solution to the first section; and/or capturing (e.g., harnessing, harvesting, converting, extracting, etc.) energy corresponding to a gradient of the concentrated fertilizer solution relative to the water solution.

The foregoing and other aspects, features, details, utilities, and/or advantages of embodiments of the present disclosure will be apparent from reading the following description, and from reviewing the accompanying drawings.

DETAILED DESCRIPTION

Reference will now be made in detail to embodiments of the present disclosure, examples of which are described herein and illustrated in the accompanying drawings. While the present disclosure will be described in conjunction with embodiments and/or examples, it will be understood that they are not intended to limit the present disclosure to these embodiments and/or examples. On the contrary, the present disclosure is intended to cover alternatives, modifications, and equivalents.

Plant production may involve significant amounts of water for irrigation and/or fertilizer for plant growth and/or nutrition. In some agricultural practices, a fertigation process may be employed. Fertigation may include, for example, diluting concentrated fertilizers in water and distributing the combined product for irrigation and fertilization. Such a dilution process between high concentration fertilizer solution and low concentration irrigation fluid/water may release a large or significant amount of energy, such as via entropy.

In embodiments, an energy system (e.g., energy systems 10, 110, 210 described below) may be configured for an energy conversion or capture process, such as pressure retarded osmosis (PRO) and/or reverse electrodialysis (RED). An energy system may be utilized in connection with fertilizer gradients, and may produce mechanical and/or electric energy or power.

In embodiments of the present concept, an osmotic pressure of fertilizer solutions, such as commercial hydroponic fertilizer solutions, may reach, for example and without limitation, between about 66 bar and about 95 bar. Diluting freshwater into such a concentrated fertilizer solution may involve a chemical reaction and/or may release energy. For example and without limitation, diluting fresh water into a concentrated fertilizer solution may release between about 1.83 kWh and about 2.64 kWh of electrical energy per cubic meter of freshwater. For comparison, energy production from natural salt gradients may be limited by osmotic pressure gradients of about 28 bar, which may correspond to a thermodynamic limit of approximately 0.77 kWh of electrical energy per cubic meter of fresh water.

With embodiments, an energy system (e.g., energy systems 10, 210) may exploit a potential in a PRO energy conversion process and may, for example and without limitation, be configured to generate power of between about 269 W and about 558 W per square meter of membrane area. A permeability of a membrane may, for example and without limitation, assuming a membrane permeability of about 8.9 l m$^{-2}$ h$^{-1}$ bar$^{-1}$. A membrane area may be proportional to the scale and/or power density of the system. In contrast, 5 W per square meter of membrane area has been suggested as a target for PRO salt gradient power production. With embodiments, additional advances in membrane-related technology may yield even higher power densities for energy systems such as those disclosed herein.

In embodiments, such as generally illustrated in FIGS. 1, 2, 3, 4, 5, and 6, an energy system 10, 110, 210 may convert a fertilizer gradient energy potential to useful work/power via one or more of a variety of processes, including pressure retarded osmosis (PRO) and/or reverse electrodialysis (RED).

Figure 1:
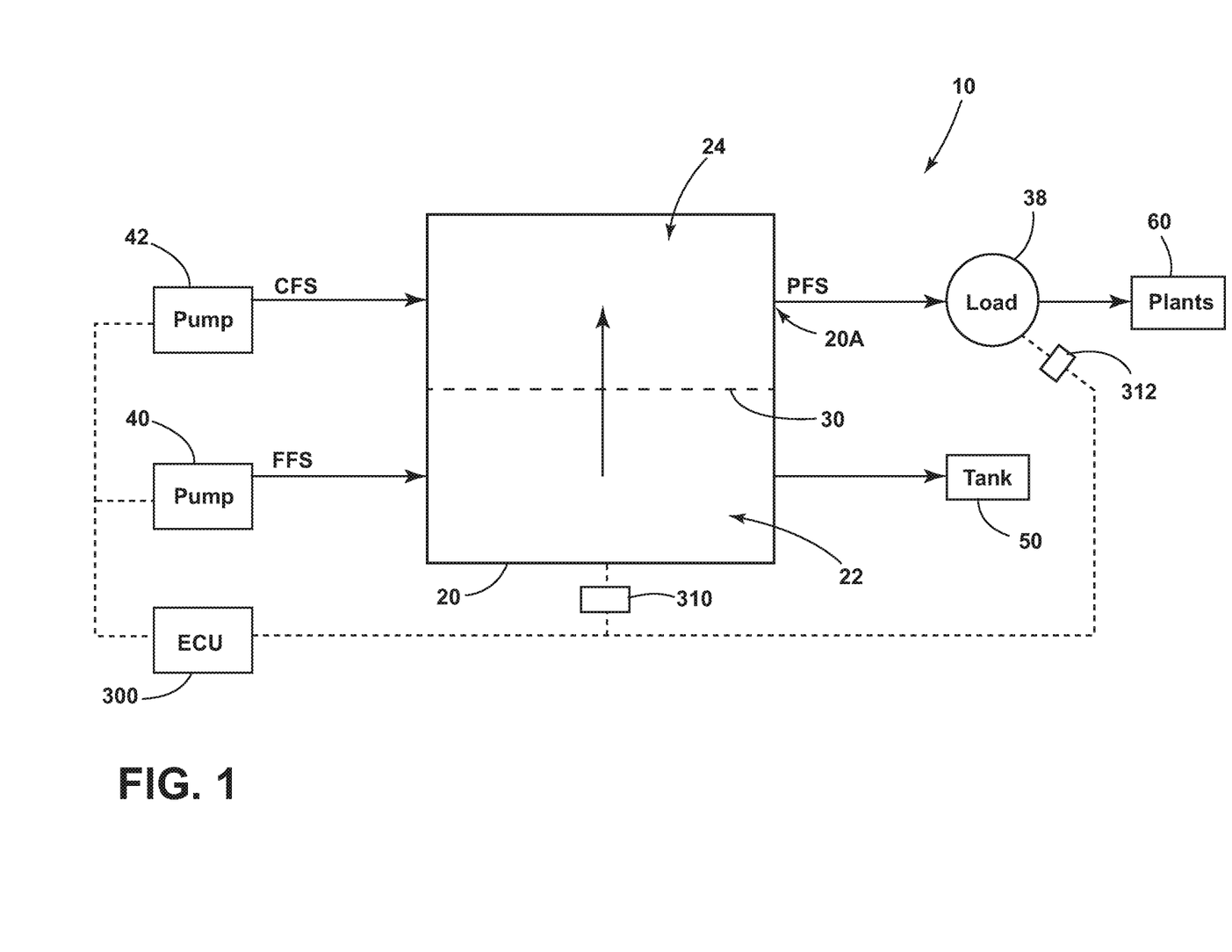
FIG. 1 is a schematic view generally illustrating an embodiment of an energy system according to teachings of the present disclosure.

In embodiments, such as generally illustrated in FIG. 1, an energy system 10 may include a membrane module 20 that may include a first section 22, a second section 24, and/or a membrane 30, such as a semipermeable membrane. PRO may include introducing a concentrated draw solution (e.g., a concentrated fertilizer solution or CFS) to the second section 24 and a diluted feed solution (e.g., a water solution, such as a freshwater feed solution, or FFS) to the first section 22 (e.g., to opposite sides of the membrane 30). A chemical difference or gradient may drive permeation from the feed side (e.g., the first section 22) to the draw side (e.g., the second section 24), which may increase a fluid pressure in the second section 24 and/or act against a load 38 (e.g., a mechanical load) connected to the second section 24. For example and without limitation, energy corresponding to (e.g., released as a result of) a gradient of the CFS to the FFS may be captured/converted via the increase in fluid pressure. Fluid, such as a product fertigation solution or PFS (which may be a product of the CFS and the FFS), may flow from the second section to the load 38 and perform or provide useful work. The PFS may then flow, at least eventually, to plants 60 to provide fertilization. A first pump 40 may be connected to the first section 22 and may be configured to pump/provide a water solution (e.g., a freshwater solution FFS) to the first section 22. A second pump 42 may be connected to the second section 24 and may be configured to pump/provide a concentrated fertilizer solution CFS to the second section 24. Fluid remaining in the first section 22 may exit the membrane module 20 via an outlet 20A that may be connected to a reservoir or tank 50.

Figure 2:
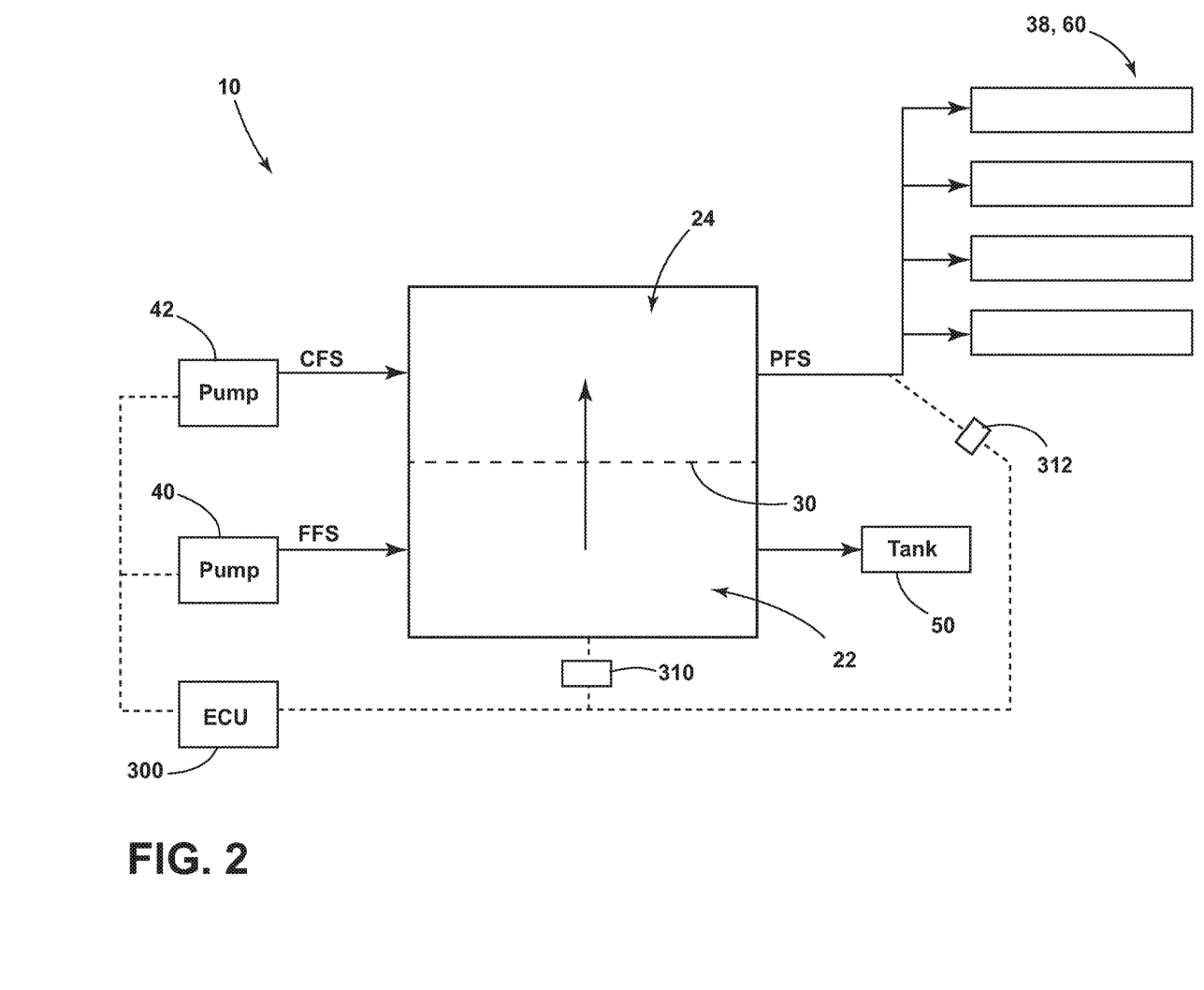
FIG. 2 is a schematic view generally illustrating an embodiment of an energy system according to teachings of the present disclosure.

In embodiments, such as generally illustrated in FIG. 2, an energy system 10 may be configured for generating/developing mechanical power via fertilizer gradient driven PRO. For example and without limitation, an energy system 10 may be configured for PRO and/or may be connected to/integrated with a hydroponic vertical plant cultivation unit (e.g., the load 38 may include and/or be replaced with a hydroponic vertical plant cultivation unit). Mechanical power may be generated across the membrane 30 (e.g., in the form of increased fluid pressure in the second section), and may be used to pump fluid, such as PFS, for circulation of nutrient/fertigation solution throughout a plant production network.

Figure 3:
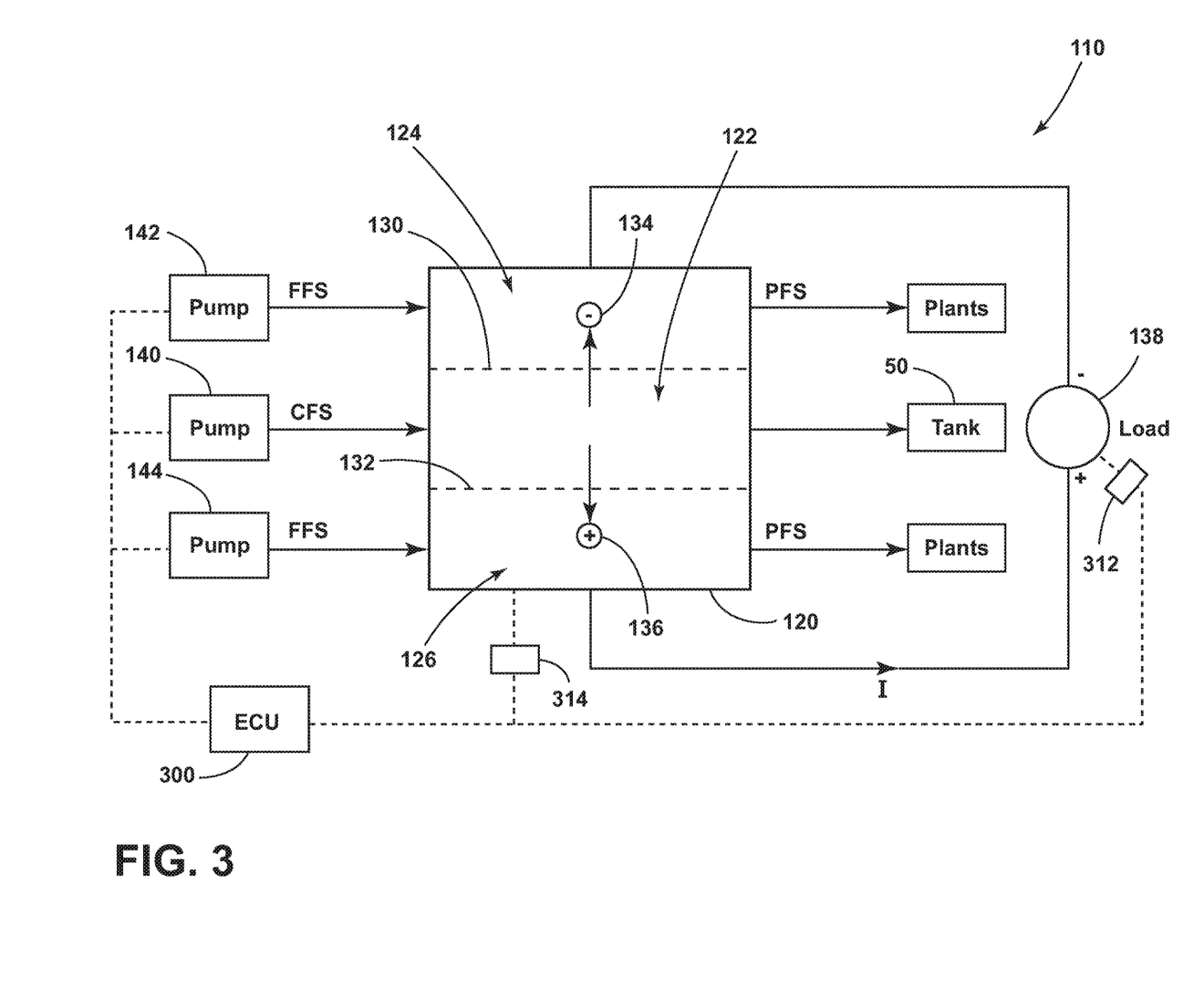
FIG. 3 is a schematic view generally illustrating an embodiment of an energy system according to teachings of the present disclosure.

In embodiments, such as generally illustrated in FIG. 3, an energy system 110 may include a membrane module 120 that may include a first section 122, a second section 124, a third section 126, a first membrane 130 (e.g., a anion exchange membrane, or AEM), and/or a second membrane 132 (e.g., a cation exchange membrane, or CEM). The first section 122 and the second section 124 may be separated by the first membrane 130, and the first section 122 and the third section 126 may be separated by the second membrane 132. An RED process may include introducing a CFS to the first section 122 and a diluted/water solution, such as an FFS, to the second section 124 and the third section 126 (e.g., into alternating sections/chambers). The first section 122, the second section 124, the third section 126, the first membrane 130, and/or the second membrane 132 may form a stack. A chemical difference between the CFS in the first section 122 and the FFS in the second section 124 and/or the third section 126 may cause ions in the CFS in the first section 122 to migrate towards the diluted FFS in the second section 124 and/or the third section 126. For example and without limitation, negatively charged ions 134 may move from the first section 122 across the first membrane 130 to the second section 124, and/or positively charged ions 136 may move from the first section 122 across the second membrane 132 to the third section 126. A resulting stack may have an electric voltage potential, which may be applied across some external load 138 (e.g., an electrical load) to drive a current I. For example and without limitation, energy corresponding to (e.g., released as a result of) a gradient of the CFS to the FFS may be captured/converted via the electric potential. A PFS may form in the second section 124 and/or the third section 126 and may, at least eventually, be provided to plants 60 for fertilization.

In embodiments, an energy system 110 may include a first pump 140, a second pump 142, and/or a third pump 144. The first pump 140 may be connected to the first section 122 and may be configured to provide a CFS to the first section 122. The second pump 142 may be connected to the second section 124 and may be configured to provide a water solution (e.g., an FFS) to the second section 124. The third pump 144 may be connected to the third section 126 and may be configured to provide a water solution (e.g., an FFS) to the third section 126.

In addition to PRO and RED, other energy conversion processes can also be applied to fertilizer gradients.

Figure 4:
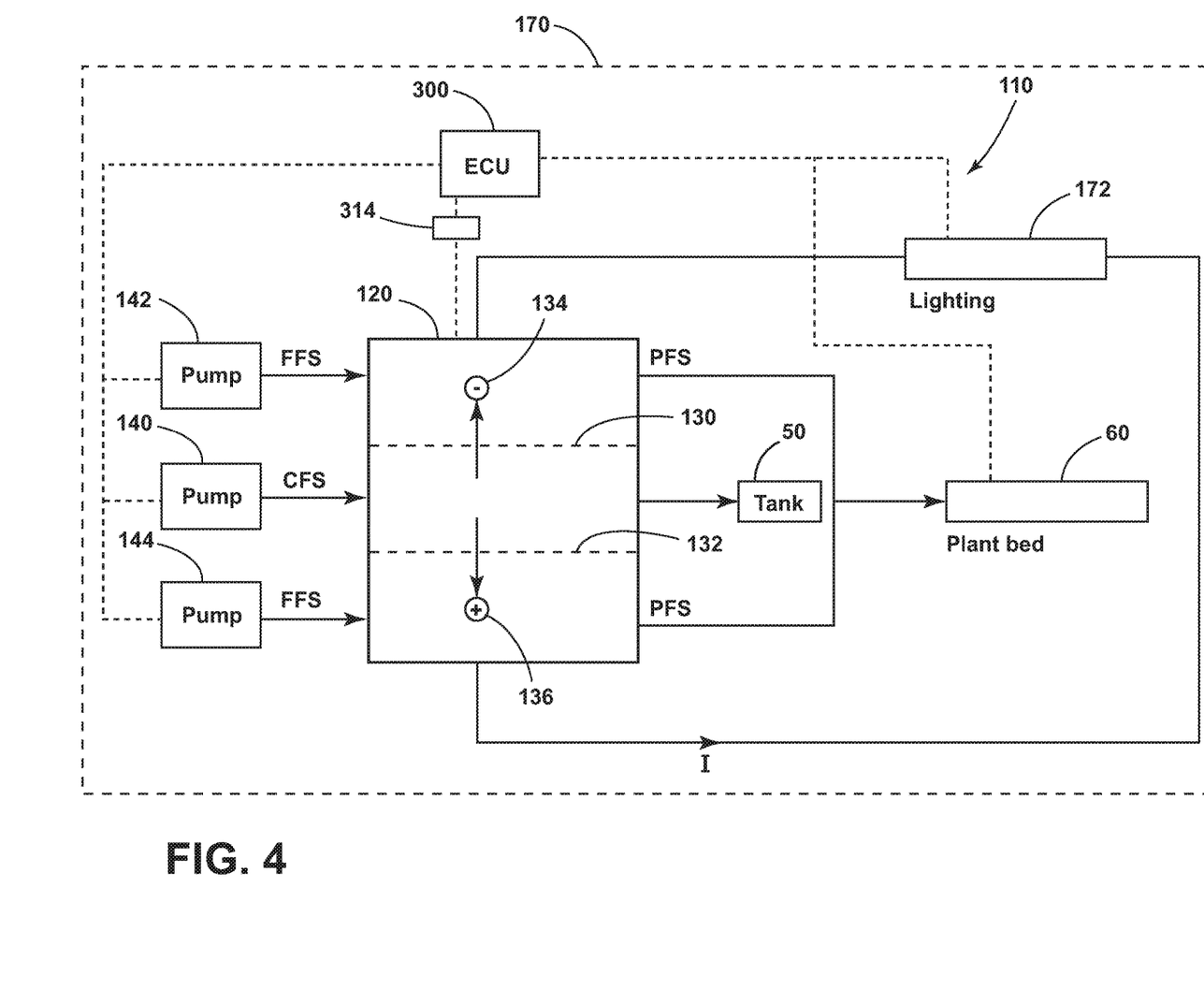
FIG. 4 is a schematic view generally illustrating an embodiment of an energy system according to teachings of the present disclosure.

In embodiments, such as generally illustrated in FIG. 4, an energy system 110 may be configured for generating electric power via fertilizer gradient driven RED. For example and without limitation, an energy system, such as the energy system 110, may be configured for RED and may be connected to/integrated with a controlled plant production environment 170, such as a greenhouse. Electric potential may be generated across a membrane module/stack 120 (e.g., with an AEM membrane 130 and/or a CEM membrane 132) and may be used to power one or more electrical components, such as, for example and without limitation, lighting 172 in the controlled environment 170.

In embodiments, fertigation may include dilution of a concentrated fertilizer solution or CFS. A reduction in osmotic pressure, energy density, and/or power density may occur with dilution. For example, a commercial hydroponic fertilizer solution may involve 250 times dilution. The final product fertigation solution or PFS may include relatively low potential, and capturing energy with such a solution may involve a large membrane area, which may result in low power densities.

Figure 5:
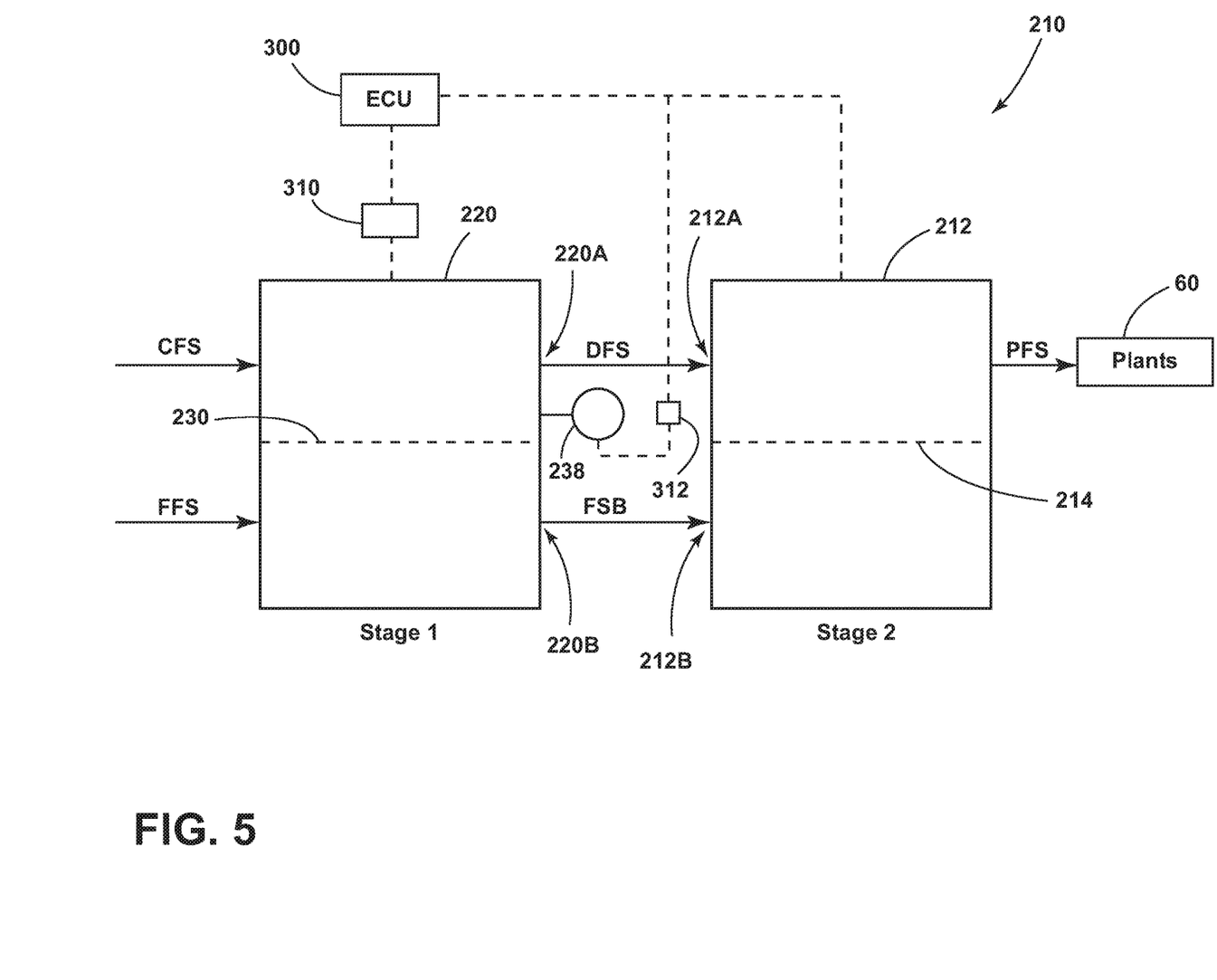
FIG. 5 is a schematic view generally illustrating an embodiment of an energy system according to teachings of the present disclosure.
Figure 6:
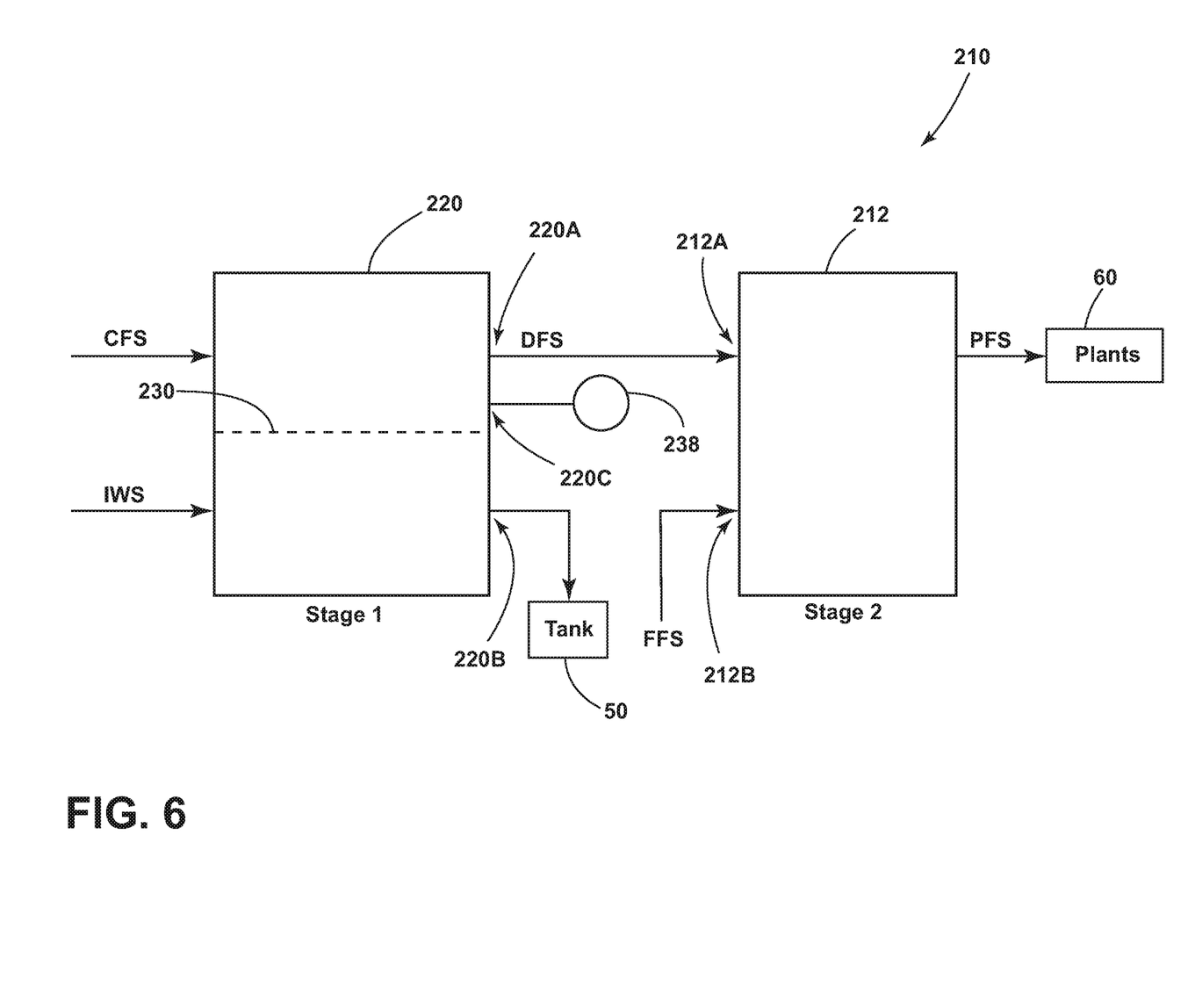
FIG. 6 is a schematic view generally illustrating an embodiment of an energy system according to teachings of the present disclosure.

With embodiments, such as generally illustrated in FIGS. 5 and 6, an energy system 210 may optimize membrane area by harvesting energy during a first part of a dilution process when concentration gradients are high, and then allow dilution to continue (e.g., in a mixing module 212) to provide a final product outside a membrane module 220. While dilution may lower a total energy extraction and/or power production, fertilizer gradient energy conversion via embodiments of energy systems such as energy system 210 may still be sufficient and/or may compare favorably to targets for salt gradients while providing improved power density.

In embodiments, such as generally illustrated in FIGS. 5 and 6, an energy system 210 may include a staged dilution configuration or process, which may overcome, reduce, and/or minimize a drop or decrease in power density that may be caused by dilution and may optimize the use of membrane area. During a first stage of the mixing process, when a concentration gradient may be large, energy may be captured via a conversion process, such as via a membrane module 220 and a load 238, which may be connected to a third outlet 220C of the membrane module 220, via PRO or RED. The membrane module 220 may, for example and without limitation, be configured in the same or a similar manner as the membrane module 20 of energy system 10 or the membrane module 120 of energy system 110. The membrane module 220 may include a first outlet 220A and/or a second outlet 220B. An output of the membrane module 220 may include a diluted fertilizer solution or DFS. The first outlet 220A of the membrane module 220 may be connected to a first inlet 212A of the mixing module 212 such that DFS from the membrane module 220 may flow to the mixing module 212.

With embodiments, during a second stage, when the concentration gradient may be reduced relative to the first stage, a mixing process may proceed outside the conversion device, such as in the mixing module 212 that may or may not include a membrane 214, instead of in the membrane module 220. If FFS is used as the feed solution for the membrane module 220, the feed solution brine or FSB may be directly reused to complete the dilution, such as generally illustrated in FIG. 5 (e.g., from a second outlet 220B of the membrane module 220 to a second inlet 212B of the mixing module 212). Such situations/embodiments may additionally permit or facilitate the recovery of nutrients that may have diffused across a membrane 230 of the membrane module 220 as reverse flux. If an impaired water solution IWS is provided to the membrane module 220, the mixing module 212 may be connected to a source of FFS, such as, for example, as generally illustrated in FIG. 6.

In some instances, commercial scale plant production facilities may include engineered irrigation and nutrient distribution systems, and embodiments of energy systems 10, 110, 210 may be integrated into such existing irrigation and fertilization systems. For example and without limitation, existing irrigation and fertilization systems may include field production systems, greenhouse systems, and/or indoor controlled environment systems. Embodiments of energy systems 10, 110, 210 may be configured for combined water and power production. Embodiments of energy systems 10, 110, 210 may have greater volumetric energy efficiency, greater power density, and/or lower fouling potential than salt gradient energy conversion systems.

Embodiments of energy systems 10, 110, 210 may be used in a variety of applications, such as agricultural applications, plant cultivation systems, indoor plant production, and/or hydroculture methods, which may include agricultural field production with central irrigation systems. For example, one possible application may include use in connection with producing lettuce greens using indoor vertical hydroponic systems. Hydroculture systems may involve fertigation and embodiments of energy systems 10, 110, 210 may be designed for and/or integrated with hydroculture systems.

With embodiments, a method of capturing energy may include providing a membrane module 20 including a first section 22 and a second section 24. The first section 22 and the second section 24 may be separated by a membrane 30. The method may include providing a concentrated fertilizer solution CFS to the first section 22. The method may include providing a water solution (e.g., an FFS) to the second section 24. The method may include capturing energy released via movement/permeation of the water solution or portions thereof from the first section 22 to the second section 24 and connecting an outlet 20A of the membrane module 20 to a load 38, such as via an increase in fluid pressure in the second section 24.

While the above method is described in connection with energy system 10, the same or similar method may be used in connection with energy system 110 (or energy system 210). For example and without limitation, a membrane module may include a third section/chamber (e.g., the third section 126 of the membrane module 120). The water solution may be provided to the third section 126. Capturing energy may include creating a potential across the membrane module 120 via a first membrane 130 (e.g., an AEM membrane) separating the first and second sections 122, 124, and via a second membrane (e.g., a CEM membrane) separating the first and third sections 124, 126.

In embodiments, a method of capturing energy may include providing a mixing module 212. A mixing module may or may not include a membrane 214. The method may include providing a water solution (e.g., an FFS) and/or a diluted fertilizer solution DFS (e.g. that may have been diluted in a membrane module 220) to the mixing module 212 to create a product fertigation solution or PFS.

In embodiments, such as generally illustrated in FIG. 1, an electronic control unit 300 (ECU) may control the flow of fluid within an energy system 10, 110, 210 (e.g., the flow of CFS, water solutions, FFS, IWS, etc.). For example and without limitation, an ECU 300 may be configured to control operation of the first pump 40 and/or the second pump 42 of the energy system 10 to control a fluid pressure in the second section 124 of the membrane module 120. Additionally or alternatively, an ECU 300 may be configured to control operation of the first pump 140, the second pump 142, and/or the third pump 144 of the energy system 110 to control an electric potential across the membrane module 120 (see, e.g., FIG. 2)

With embodiments, such as generally illustrated in FIG. 1, an energy system 10 may include one or more sensors that may be configured to sense (e.g., determine, monitor, measure, obtain, etc.) one or more characteristics of the energy system 10. For example and without limitation, a pressure sensor 310 may be configured to sense a fluid pressure in the first section 22 and/or the second section 24 of the membrane module 20. Additionally or alternatively, a load sensor 312 may be configured to sense a power output of the load 38. An ECU 300 may be configured to control the energy system 10 according to information from the one or more sensors (e.g., from the pressure sensor 310 and/or the load sensor 312). For example and without limitation, if additional power generation is desired, the ECU 300 may increase the gradient between the first section 22 and the second section 24, such as via controlling the first pump 40 to cause less FFS to be provided to the first section 22 and/or controlling the second pump 42 to cause more CFS to be provided to the second section 24.

In embodiments, such as generally illustrated in FIG. 3, an energy system 110 may include a potential sensor 314 that may be configured to sense an electric potential across the membrane module 120. An ECU 300 may be configured to control the energy system 110 according to information from the potential sensor 314. For example and without limitation, if a greater electric potential is desired, the ECU 300 may (i) control the first pump 140 to increase the CFS provided to the first section 122, (ii) control the second pump 142 to decrease the FFS provided to the second section 124, and/or (iii) control the third pump 144 to decrease the FFS provided to the third section 126. Additionally or alternatively, the ECU 300 may control the energy system 110 according to information from the load sensor 312.

In embodiments, an energy system (e.g., energy systems 10, 110, 210) may perform better than salt gradient processes with respect to membrane fouling. For example and without limitation, salt gradient power may be limited/challenged by membrane fouling caused by river water at natural gradients and mitigating the issue may involve costly and energy-intensive pretreatment. In some cases, fertigation solution may be produced from water that has already been processed and may have less potential for membrane fouling. With embodiments of energy systems (e.g., energy systems 10, 110, 210), membrane fouling from organics in concentrated fertilizer solutions may be relatively minimal and/or may be effectively mitigated via backwash maintenance.

With embodiments, an ECU 300 may include an electronic controller and/or include an electronic processor, such as a programmable microprocessor and/or microcontroller. In embodiments, an ECU 300 may include, for example, an application specific integrated circuit (ASIC). An ECU 300 may include a central processing unit (CPU), a memory (e.g., a non-transitory computer-readable storage medium), and/or an input/output (I/O) interface. An ECU 300 may be configured to perform various functions, including those described in greater detail herein, with appropriate programming instructions and/or code embodied in software, hardware, and/or other medium. In embodiments, an ECU 300 may include a plurality of controllers. In embodiments, an ECU 300 may be connected to a display, such as a touchscreen display.

Various embodiments are described herein for various apparatuses, systems, and/or methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments.

Reference throughout the specification to "various embodiments," "with embodiments," "in embodiments," or "an embodiment," or the like, means that a particular feature, structure, or characteristic described in connection with the embodiment is included in at least one embodiment. Thus, appearances of the phrases "in various embodiments," "with embodiments," "in embodiments," or "an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment/example may be combined, in whole or in part, with the features, structures, functions, and/or characteristics of one or more other embodiments/examples without limitation given that such combination is not illogical or non-functional. Moreover, many modifications may be made to adapt a particular situation or material to the teachings of the present disclosure without departing from the scope thereof.

It should be understood that references to a single element are not necessarily so limited and may include one or more of such element. Any directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of embodiments.

Joinder references (e.g., attached, coupled, connected, and the like) are to be construed broadly and may include intermediate members between a connection of elements and relative movement between elements. As such, joinder references do not necessarily imply that two elements are directly connected/coupled and in fixed relation to each other. The use of "e.g." in the specification is to be construed broadly and is used to provide non-limiting examples of embodiments of the disclosure, and the disclosure is not limited to such examples. Uses of "and" and "or" are to be construed broadly (e.g., to be treated as "and/or"). For example and without limitation, uses of "and" do not necessarily require all elements or features listed, and uses of "or" are intended to be inclusive unless such a construction would be illogical.

While processes, systems, and methods may be described herein in connection with one or more steps in a particular sequence, it should be understood that such methods may be practiced with the steps in a different order, with certain steps performed simultaneously, with additional steps, and/or with certain described steps omitted.

It is intended that all matter contained in the above description or shown in the accompanying drawings shall be interpreted as illustrative only and not limiting. Changes in detail or structure may be made without departing from the present disclosure.

What is claimed is:

1. A fertilizer gradient energy system, comprising:
   a membrane module including a first section and a second section, the first section and the second section being separated by a semipermeable membrane; and a load connected to the membrane module;
wherein the first section is configured to receive a water solution, the second section is configured to receive a concentrated fertilizer solution, and the semipermeable membrane is configured to facilitate pressure retarded osmosis of the water solution from the first section to the second section to generate a product fertilizer solution and increase a fluid pressure in the second section.

2. The fertilizer gradient energy system of claim 1, wherein the load includes stacked plant beds and the increase of the fluid pressure pumps the product fertilizer solution to the stacked plant beds.

3. The fertilizer gradient energy system of claim 1, including a first pump connected to the first section of the membrane module, a second pump connected to the second section of the membrane module, and an electronic control unit (ECU); wherein the ECU is configured to control operation of the first pump and the second pump to control the fluid pressure in the first section.

4. The fertilizer gradient energy system of claim 1, including a mixing module connected to an outlet of the membrane module.

5. The fertilizer gradient energy system of claim 4, wherein the second section of the membrane module is connected to the mixing module.

6. The fertilizer gradient energy system of claim 5, wherein the first section of the membrane module is connected to the mixing module and the water solution is a freshwater feed solution.

7. The fertilizer gradient energy system of claim 5, wherein the water solution is an impaired water solution; and the mixing module is connected to a source of a freshwater solution.

8. The fertilizer gradient energy system of claim 4, wherein the mixing module includes a membrane.

9. The fertilizer gradient energy system of claim 1, wherein the load is a mechanical load connected to the second section; and the pressure retarded osmosis of the water solution from the first section to the second section acts against the mechanical load.

10. The fertilizer gradient energy system of claim 1, wherein a chemical gradient drives permeation from the first section to the second section to generate the product fertilizer solution.

11. The fertilizer gradient energy system of claim 10, wherein the chemical gradient drives permeation of the water solution from the first section to the second section to increase the fluid pressure in the second section.

12. The fertilizer gradient energy system of claim 11, wherein the chemical gradient further drives permeation of the water solution from the first section to the second section to act against the load.

13. The fertilizer gradient energy system of claim 1, wherein mechanical power is generated across the semipermeable membrane in the form of the increase in the fluid pressure in the second section.

14. A fertilizer gradient energy system, comprising:
a membrane module including:
a first section;
a second section;
a third section;
an anion exchange membrane separating the first section and the second section; and
a cation exchange membrane separating the first section and the third section; and
a load connected to the membrane module;
wherein the first section is configured to receive a concentrated fertilizer solution, the second section and the third section are configured to receive a freshwater feed solution, and at least one of the anion exchange membrane and the cation exchange membrane is configured to facilitate reverse electrodialysis of ions of the concentrated fertilizer solution from the first section to one or both of the second section and the third section to create an electric potential across the membrane module.

15. The fertilizer gradient energy system of claim 14, including a first pump connected to the first section, a second pump connected to the second section, a third pump connected to the third section, and an electronic control unit configured to control operation of the first pump, the second pump, and the third pump to control the electrical potential.

16. A method of capturing energy, comprising:
providing a membrane module including a first section and a second section, the first section and the second section being separated by a membrane, wherein the membrane is configured to facilitate pressure retarded osmosis between the first section and the second section;
providing a concentrated fertilizer solution to the second section;
providing a water solution to the first section; and
capturing energy corresponding to a gradient of the concentrated fertilizer solution relative to the water solution.

17. The method of claim 16, wherein the water solution is an impaired water solution.

18. The method of claim 16, including
creating a diluted fertilizer solution in the second section of the membrane module, the diluted fertilizer solution being a product of the concentrated fertilizer solution and the water solution;
providing a mixing module;
providing the diluted fertilizer solution to the mixing module; and
providing a second water solution to the mixing module to create a fertigation solution.

19. The method of claim 18, wherein the water solution is a freshwater feed solution; and the second water solution is a feed solution brine from the first section of the membrane module.

20. The method of claim 16, including powering one or more lights via the captured energy.

21. The method of claim 16, wherein the membrane module includes a second membrane and a third section.

22. The method of claim 21, wherein the membrane is an anion exchange membrane, and the second membrane is a cation exchange membrane.

23. The method of claim 22, wherein an outlet of the membrane module is connected to an inlet of a mixing module.

24. The method of claim 23, wherein a second outlet of the membrane module is connected to a second inlet of the mixing module.

25. The method of claim 24, including providing a product fertigation solution from the mixing module to one or more plants.

* * * * *